(12) United States Patent
Boling (10) Patent No.: US 7,667,942 B2
(45) Date of Patent: Feb. 23, 2010

(54) BATTERY SWITCH FOR DOWNHOLE TOOLS

(75) Inventor: Brian E. Boling, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/905,050

(22) Filed: Dec. 13, 2004

(65) Prior Publication Data

US 2006/0126249 A1 Jun. 15, 2006

(51) Int. Cl.
*H02H 5/04* (2006.01)
(52) U.S. Cl. ...................................... 361/103
(58) Field of Classification Search ............... 361/93.8, 361/103, 105–106
See application file for complete search history.

(56) References Cited

U.S. PATENT DOCUMENTS

| 2,627,392 | A | * | 2/1953 | Morris ......................... 175/24 |
| 3,656,045 | A | * | 4/1972 | Frezzolini et al. ............ 320/136 |
| 3,895,283 | A | * | 7/1975 | Peterson ...................... 322/33 |
| 3,928,792 | A | * | 12/1975 | Mullersman et al. ........ 320/154 |
| 4,355,086 | A | * | 10/1982 | Saathoff et al. ............. 429/105 |
| 4,416,000 | A | * | 11/1983 | Scherbatskoy ............... 367/81 |
| 4,543,795 | A | * | 10/1985 | Ward et al. .................... 62/158 |
| 4,839,248 | A | * | 6/1989 | Magnussen et al. ........... 429/49 |
| 5,070,427 | A | * | 12/1991 | Bush ........................... 361/104 |
| 5,103,156 | A | | 4/1992 | Jones et al. |
| 5,114,811 | A | * | 5/1992 | Ebel et al. .................... 429/337 |
| 5,216,357 | A | | 6/1993 | Coppola et al. |
| 5,303,872 | A | | 4/1994 | Milewits et al. |
| 5,516,603 | A | | 5/1996 | Holcombe |
| 5,599,636 | A | | 2/1997 | Braun |
| 5,635,773 | A | * | 6/1997 | Stuart ........................... 307/66 |
| 5,907,232 | A | | 5/1999 | Wakefield |
| 6,025,696 | A | | 2/2000 | Lenhart et al. |
| 6,025,699 | A | | 2/2000 | Cummings |
| 6,034,510 | A | | 3/2000 | Kikuchi et al. |
| 6,045,941 | A | | 4/2000 | Milewits |
| 6,163,359 | A | * | 12/2000 | Smith et al. ................. 349/161 |
| 6,187,469 | B1 | | 2/2001 | Marincic et al. |
| 6,501,249 | B1 | * | 12/2002 | Drori .......................... 320/149 |
| 6,570,749 | B1 | | 5/2003 | Ling et al. |
| 6,583,592 | B2 | | 6/2003 | Omata et al. |
| 6,661,203 | B2 | | 12/2003 | Wolin et al. |
| 6,674,265 | B2 | * | 1/2004 | Yoshida et al. .............. 320/125 |
| 6,761,570 | B2 | * | 7/2004 | Patterson et al. ............ 439/188 |
| 6,771,051 | B2 | | 8/2004 | Oglesbee et al. |
| 2002/0057211 | A1 | * | 5/2002 | Tubel et al. .............. 340/856.4 |
| 2002/0104031 | A1 | | 8/2002 | Tomlinson et al. .......... 713/320 |
| 2005/0194183 | A1 | * | 9/2005 | Gleitman et al. .............. 175/45 |

FOREIGN PATENT DOCUMENTS

JP 2001283926 A * 3/2000

* cited by examiner

*Primary Examiner*—Fritz M Fleming
*Assistant Examiner*—Terrence R Willoughby
(74) *Attorney, Agent, or Firm*—Jonna Flores; Darla Fonseca; Brigitte Echols (57) ABSTRACT

An electrical circuit for a downhole tool may include a battery, a load electrically connected to the battery, and at least one switch electrically connected in series with the battery and to the load. The at least one switch may be configured to close when a tool temperature exceeds a selected temperature.

42 Claims, 7 Drawing Sheets

BATTERY SWITCH FOR DOWNHOLE TOOLS

STATEMENT REGARDING FEDERALLY SPONSORED RESEARCH OR DEVELOPMENT

This invention was made with Government support under Cooperative Agreement No. DE-FC26-03NT41835 awarded by the department of Energy (DOE). The Government has certain rights in this invention.

BACKGROUND OF INVENTION

Wells are generally drilled into the ground to recover natural deposits of oil and gas, as well as other desirable materials, that are trapped in geological formations in the Earth's crust. A well is drilled into the ground using a drill bit at the end of a drill string. The drill bit is directed to the targeted geological location from a drilling rig at the Earth's surface. A drilling fluid, called "mud," is pumped down through the drill string to the drill bit. The mud cools and lubricates the drill bit, and it carries the drill cuttings away from the bottom of the borehole. The mud and the drill cuttings flow to the surface through the annulus between the drill string and the borehole wall.

Figure 1A:
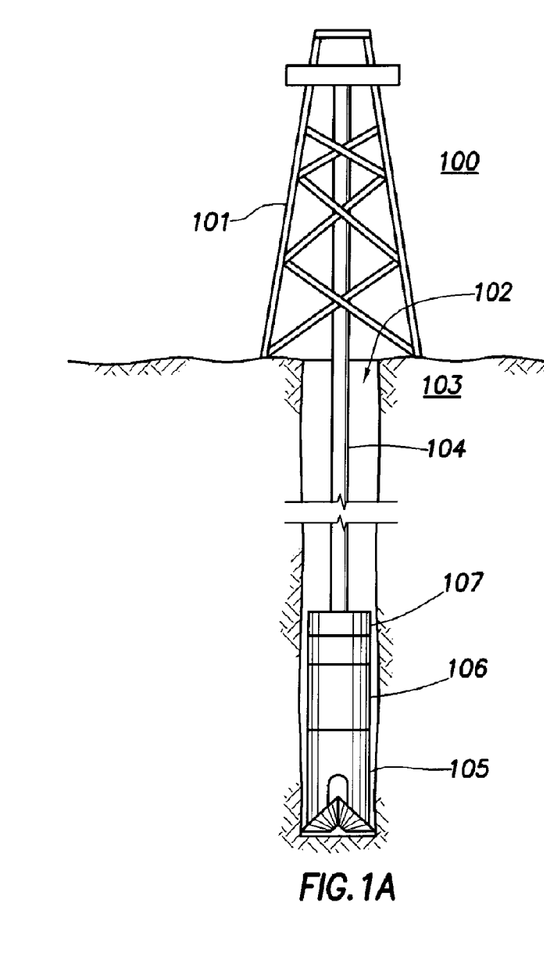
FIG. 1A shows a view of a rig with a drilling tool suspended from the rig.

FIG. 1A shows a typical drilling system 100. A drill string 104 is suspended in a borehole 102 from a drilling rig 101 at the surface. A drill bit 105 at the lower end of the drill string 104 is used to drill through earth formations 103. The bottom hole assembly ("BHA") commonly includes drilling tools, sensors, computers, and other equipment that may be used in the drilling process. For example, FIG. 1A generally shows a drill collar 107 and a drilling tool 106 that may contain these types of equipment.

Figure 1B:
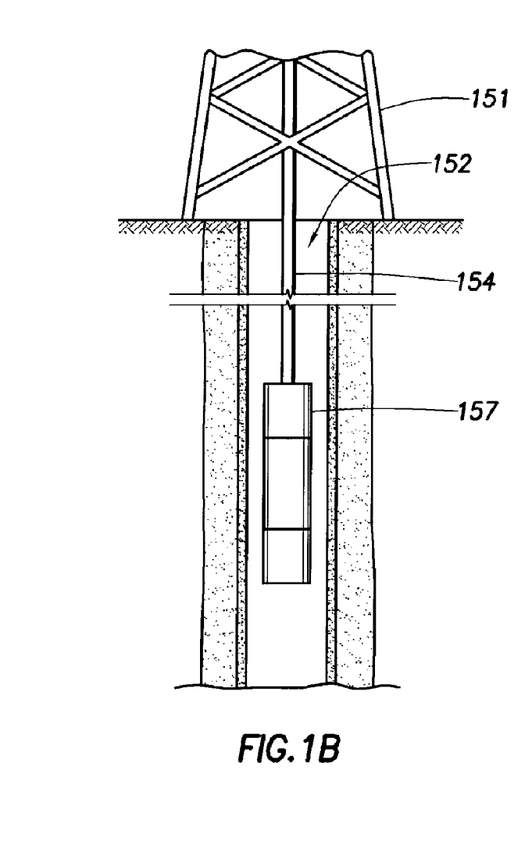
FIG. 1B shows a wireline tool deployed into a wellbore.

FIG. 1B shows a typical wireline tool 157. The tool 157 is suspended in a borehole 152 from a rig 151 via wireline 154. Typically, wireline tools, such as tool 157 in FIG. 1B, are lowered into a well after drilling has been completed or during interruptions in the drilling process when the drill string has been removed from the well. A typical wireline tool includes sensors and other equipment that are used to investigate the earth formations and their contents.

Many of the tools, sensors, and other equipment that are used in downhole tools, such as the drilling tools and wireline tools of FIGS. 1A and 1B, require electrical power. A battery may be installed in the tool to supply electrical power to the tool when the tool is downhole.

The hydrostatic pressure of the mud in the borehole increases with increasing depth. In addition to the increased pressure, the temperature of the mud also generally increases with increasing depth. The increase in temperature is caused by the increasing heat generated in the Earth's mantle. Thus, downhole tools are often operated in a high-temperature environment. In some cases, the temperatures may be above about 125° C.

Conventional batteries are generally not well-suited for operation in a high temperature environment. In fact, most industrial and commercial battery applications include protection devices that will disable or discharge a battery if the ambient temperature becomes too high. This will prevent the battery from corroding or even exploding, in extreme cases. For example, U.S. Pat. No. 6,570,749 discloses an over-current and thermal protection device. The device will regulate the current drawn from the battery in the event that the battery temperature becomes too high.

Another device, disclosed in U.S. Pat. No. 6,025,699, is designed to close a discharge circuit when the battery temperature is high for the amount of energy stored in the battery. The discharge circuit will enable the battery to discharge to a safe level for the battery temperature.

Because the temperature in the downhole environment usually exceeds the normal operating range of a typical commercial or industrial battery, drilling tools and wireline tools are often equipped with a high-temperature battery. A high-temperature battery has an altered chemistry so that it is able to more efficiently provide electrical power at high temperature, without any danger of explosion or corrosion. For example, a high-temperature battery, designed to efficiently operate at temperatures above 125° C., is disclosed in U.S. Pat. No. 6,187,469.

A high-temperature battery, however, will generally operate inefficiently at lower temperatures. Moreover, drawing power from a high temperature battery at low temperatures may effectively consume an inordinate amount of electrical power that cannot be recovered.

What is needed, therefore, are techniques for protecting a battery of a downhole tool when it is exposed to temperatures below an operating threshold. It is desirable that an electrical circuit be provided to prevent excessive power loss from a battery when the downhole tool is exposed to temperature below a given threshold. It is further desirable, in some cases, for an electrical circuit to provide one or more of the following among others: greater reliability for battery power, flexibility in circuitry options, increased battery life, increased battery efficiency, protection for the battery, and alternate power sources.

SUMMARY OF INVENTION

In at least one aspect, the invention relates to an electrical circuit for a downhole tool that includes a battery, a load electrically connected to the battery, and at least one switch electrically connected in series with the battery and to the load. At least one switch may be configured to close when a tool temperature exceeds a selected temperature. A control electronics may be operatively connected to the at least one switch to control the at least one switch to close when the tool temperature exceeds the selected temperature. The selected temperature may be selected to be higher than a lowest point in an operating range for the battery. The downhole tool may be a drilling tool, a wireline tool, or any other type of downhole tool.

In another aspect, the invention relates to a method for preventing power loss in a battery in a downhole tool positioned in a wellbore penetrating a subsurface formation. The method includes measuring a tool temperature and closing at least one switch in a battery circuit when the tool temperature exceeds a selected temperature. The method may also include using a hysteresis mechanism to prevent repeated opening and closing of the at least one switch when the tool temperature is near the selected temperature.

In another aspect, the invention relates to downhole tool that includes a battery, a tool component electrically connected to the battery, and at least one switch electrically connected between the battery and the tool component. The at least one switch may be configured to close when a tool temperature exceeds a selected temperature.

Other aspects and advantages of the invention will be apparent from the following description and the appended claims.

DETAILED DESCRIPTION

The present invention relates to downhole tool circuits that include one or more switches to disengage a battery when the tool temperature is not within a desired operating range for the battery. The invention may also relate to various other components that may be useful in such a system.

The following section includes definitions of specific terms used in this disclosure.

In this disclosure, components that are "electrically connected" are connected in such a way that electric current may flow between the components. Components that are electrically connected may include additional components that are connected between them. In addition, in some cases, a switch may be electrically connected to various components in a circuit. Even though a switch may be in an open position, which would break the circuit and prevent electrical flow, this does not prevent components from being electrically connected in accordance with the invention. A switch is intended to be closed at certain times, and at those times, electrical current may flow between the components that are electrically connected.

"Operatively coupled" refers to components that are coupled together in such a manner that they may operate together. For example, a control device may control the position of a switch. The connection between the control device and the switch that enables the device to control the position of the switch is operatively coupled.

A circuit element that is referred to as being either "in series" or "in parallel" is connected in the manner known in the art for those terms. Series means that electrical current must flow through the components that are connected in series, and parallel means that the components so connected form alternate flow paths.

Figure 2:
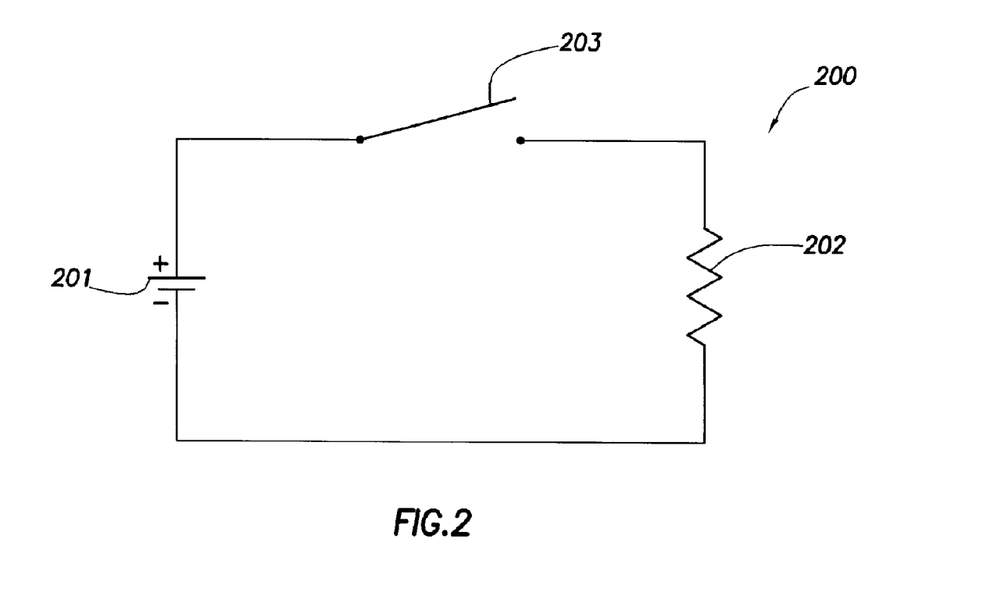
FIG. 2 shows a schematic of an electrical circuit for a downhole tool battery.

FIG. 2 shows a schematic of an electrical circuit 200 for a downhole tool. The circuit 200 includes a battery 201 that is connected to a load 202. The load 202 may be any tool component that requires electrical power. In some cases, the battery is a high-temperature battery that uses a specific chemistry to deliver optimum power at a high temperature. For example, the battery may be a lithium thionyl chloride battery, or any other high-temperature battery known in the art.

A switch 203 is electrically connected in series with the battery 201 and the load 202. The switch 203 may be configured to remain open (i.e., a broken circuit) as long as the temperature of the tool remains below a selected temperature. The switch may close (i.e., complete the circuit) when the tool temperature exceeds a selected temperature.

The switch 203 may be any switch known in the art. The switch 203 may be a mechanical switch, an electrical switch, and electro-mechanical switch, or any combination of mechanical and electrical switches. A switch may include its associated circuitry. For example, the switch 203 may be a bimetallic thermostat, a relay, a transistor, a thermistor, or any other switching device known in the art. It is also noted that a mechanical switch may form part of an electrical circuit within the scope of the invention. For example, a bimetallic switch is a mechanical device that may be used as a switch. When the tool temperature exceeds the selected temperature, a bimetallic switch will close the circuit, enabling the flow of electrical current.

The selected temperature may be a temperature above which the battery 203 will operate normally. In some cases, the selected temperature is selected based on a preferred operating range for the battery. For example, the selected temperature may be the lower point of the operating range. In some cases, the selected temperature may be selected just above the lower point of the preferred operating range for the battery. For example, the selected temperature may be about 70° C. for a particular battery. In other cases, a particular battery may not operate efficiently unless the temperature may be above about 100° C. These temperatures are provided only as examples. The particular temperature threshold for efficient battery operation will depend on the operating characteristics of the battery and other operating conditions.

Figure 3:
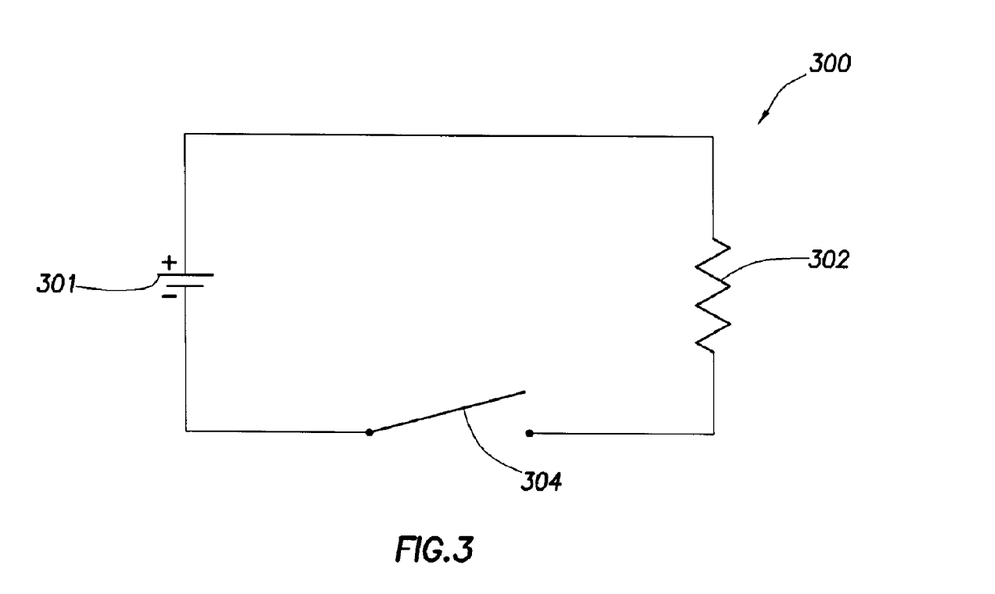
FIG. 3 shows the schematic of another configuration of a downhole tool battery circuit.

In FIG. 2, the switch 203 is connected between the load 203 and the positive terminal of the battery 201. In other cases, such as shown in FIG. 3, a circuit 300 may include a switch 304 that is connected between the load 302 and the negative terminal of the battery 301.

Figure 4:
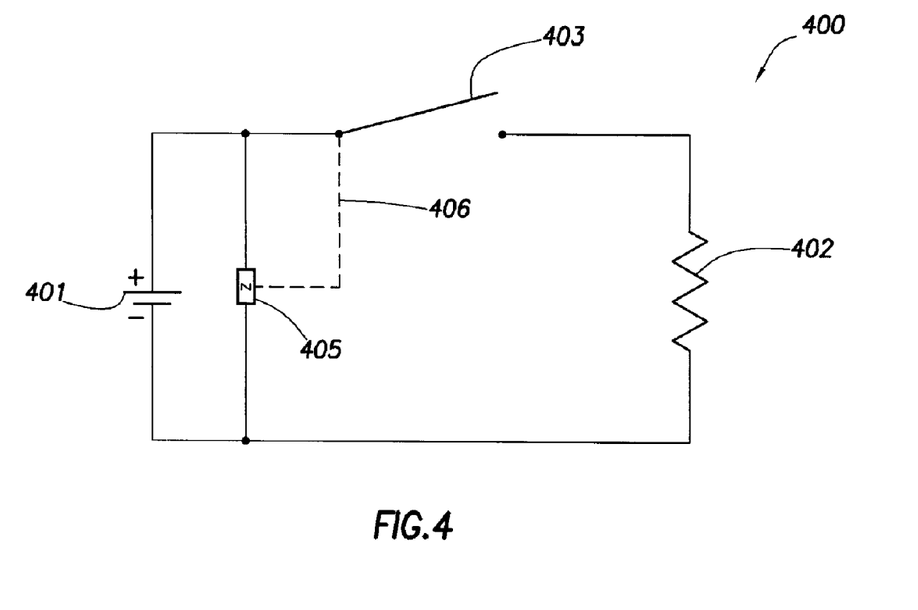
FIG. 4 shows a schematic of an electrical circuit for a downhole tool battery provided with control electronics.

FIG. 4 shows a schematic of a downhole circuit 400 that includes a switch 403 electrically connected between a load 402 and a battery 401. The circuit in FIG. 4 also includes a control electronics 405. The control electronics 405 may be configured to measure the tool temperature or it may receive data relating to the downhole tool temperature from a separate temperature sensor (not shown). The control electronics 405 controls the switch 403 so that the switch 403 remains open when the tool temperature remains below the selected temperature, and so that the switch 403 will close when the tool temperature exceeds the selected temperature. In some cases, the control electronics may be programmed with a hysteresis routine to prevent repeated opening and closing of the switch near the selected temperature. In FIG. 4, the control electronics 405 is shown operatively coupled to the switch 403 by dashed line 406.

The control electronics 405 in FIG. 4 is connected in parallel with the switch 403 and the load 402. In this configuration, the control electronics 405 may receive electrical power from the battery 401, irrespective of the position of the switch 403. The type of electronics required to control the switch 403 will generally consume much less power than components of a typical downhole tool will consume in operation. For example, a control electronics 405 may consume only a few milliwatts of power, whereas a typical downhole tool component may consume several watts of power. Because of the substantially small power consumption of the control electronics 405, it may be powered by the battery 401 at low temperatures without any significant losses due to inefficiencies in the battery at low temperatures. It is also noted that a control electronics need not be connected to the battery. For example, a control electronics may draw power from a different power source, without departing from the invention.

Figure 5:
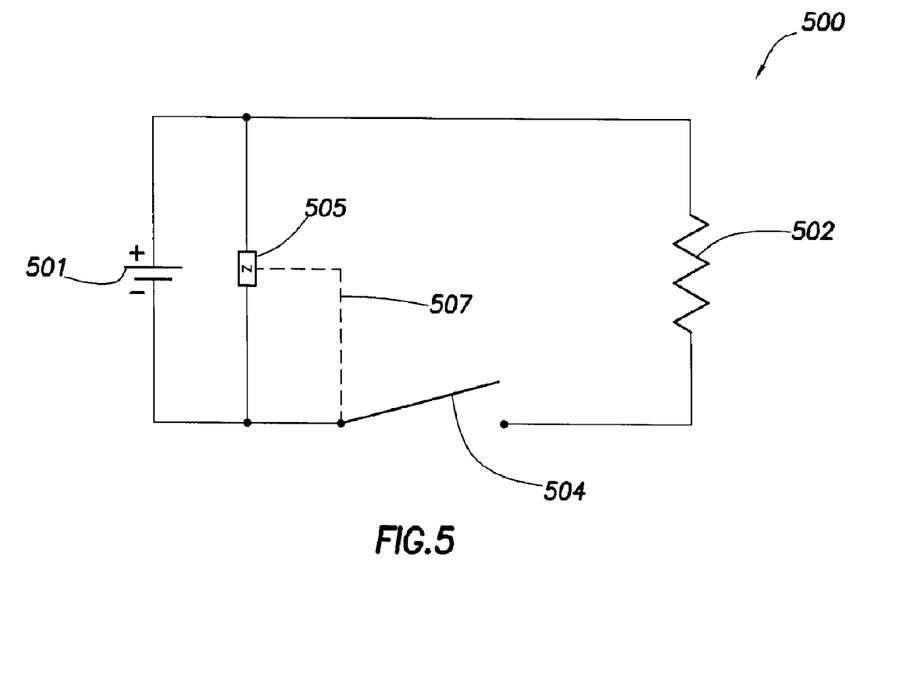
FIG. 5 shows a schematic of another configuration of an electrical circuit for a downhole tool battery provided with control electronics.

FIG. 5 shows a circuit 500 with a battery 501 connected to a load 502. The switch 504 is controlled by a control electronics 505 that is operatively coupled (shown at dashed line 507) to the switch 504. As with the switch 304 in FIG. 3, the switch 504 in FIG. 5 is connected between the load 502 and the negative terminal of the battery 501.

Figure 6:
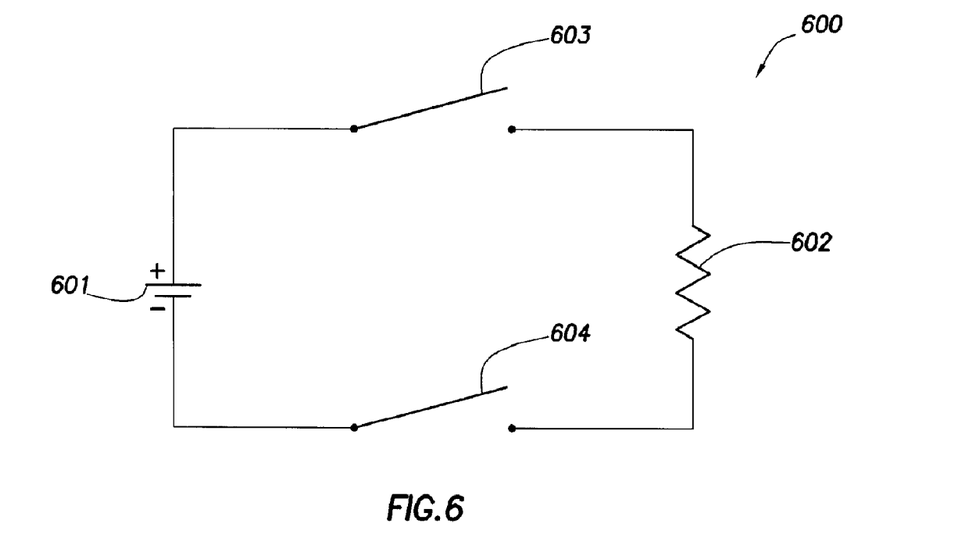
FIG. 6 shows a schematic of an electrical circuit for a downhole tool battery provided with two switches.
Figure 7:
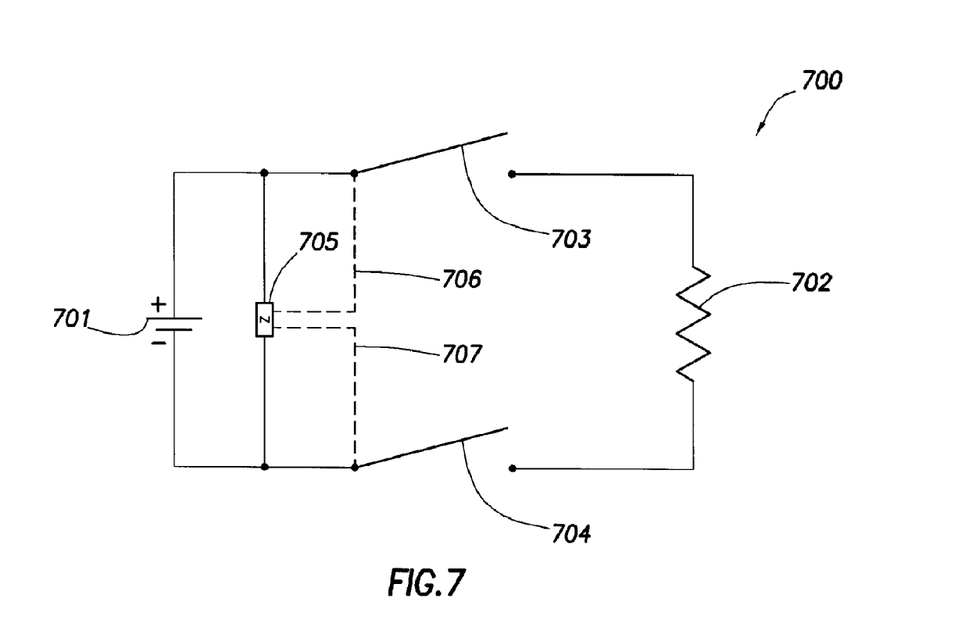
FIG. 7 shows a schematic of an electrical circuit for a downhole tool battery provided with two switches and control electronics.

FIGS. 6 and 7 show examples of circuits that include two switches. In FIG. 6, the circuit 600 includes a first switch 603 and a second switch 604, which are electrically connected in series with the battery 601 and the load 602. The first switch 603 is connected between the load 602 and the positive terminal of the battery 601, and the second switch 604 is connected between the load 602 and the negative terminal of the battery 601.

One reason to include multiple switches (e.g., switches 603 and 604 in FIG. 6) is for redundancy. If one switch becomes stuck in the closed position, the other switch may still act to break the circuit when the tool temperature falls below the selected temperature. The inclusion of redundant switches enables the use of a "fail closed" system, in which a malfunctioning switch will fail to the closed position. In such a case, the second switch may continue to open and close to prevent unnecessary battery power loss at low temperatures.

The circuit 700 in FIG. 7 includes two switches 703, 704 and a control electronics 705. The control electronics 705 is operatively coupled to the first switch 703 (shown at dashed line 706) and to the second switch 704 (shown at dashed line 707). In addition, as will be understood by those having ordinary skill in the art, a circuit may include two or more control electronics for controlling multiple switches, without departing from the scope of the invention.

Figure 8:
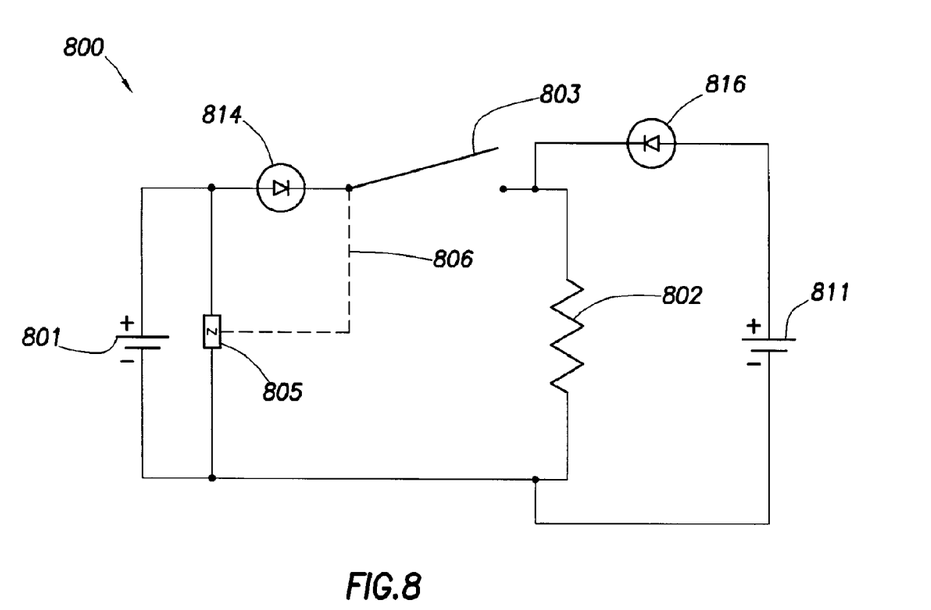
FIG. 8 shows a schematic of another electrical circuit for a downhole tool battery provided with a diode.

FIG. 8 is a schematic of a circuit 800 that includes a battery 801 electrically connected to a load 802. The circuit includes a switch 803 that is connected between the load 802 and the battery 801, and the switch 803 is operatively coupled (shown at dashed line 806) to a control electronics 805 for controlling the switch 803 to close when the tool temperature exceeds a selected temperature. The circuit 800 also includes a connector (not shown) that may be connected to an external power source 811. This may be advantageous at the surface when the tool temperature is below the selected temperature, but the tool must be accessed for data retrieval, programming, and other functions that may be performed on a downhole tool at the surface.

The connector (not shown) is electrically connected to the load 802 so that the external power source 811, when connected, will bypass the battery 801 and the switch 803. In addition, the circuit 800 shown in FIG. 8 includes a diode 814 that forms a diode-OR gate with a second diode 816 in the circuit of the external power source 811. The diode-OR gate will enable external power to be applied to the load 802, while preventing the battery 801 and the external power source 811 from sinking current. Depending on the particular chemistry of the battery 801, the diode-OR gate may be useful in preventing the external power source 811 from powering or charging the battery 801 in an unsafe manner. The diode-OR gate will also function to allow the external power source 811 to supersede the battery power, even when the switch 803 is closed. This will conserve battery power.

Figure 9:
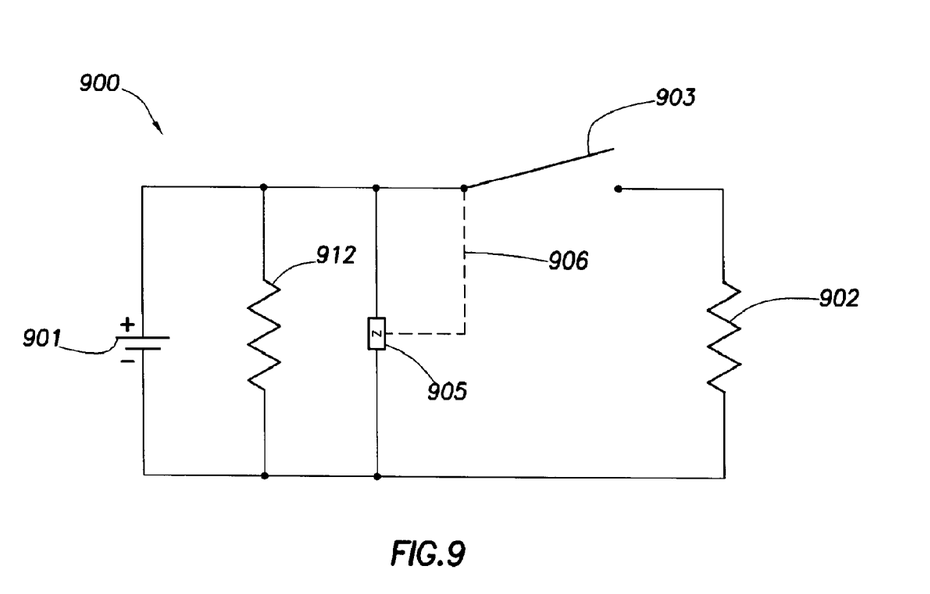
FIG. 9 shows a schematic of another electrical circuit for a downhole tool battery provided with a secondary load.

FIG. 9 shows a circuit 900 that is similar to the circuit 400 in FIG. 4, except that the circuit 900 in FIG. 9 includes a secondary load 912. The circuit 900 includes a battery 901 that is connected to a load 902 via a switch 903 that is controlled by a control electronics 905 operatively coupled (shown at 906) to the switch 903. The secondary load may be any component that requires a continuous small load. For example, the secondary load 912 may be a computer or electronic memory that requires a very small load to maintain the data stored in the memory. Thus, in the circuit 900 in FIG. 9, both the control electronics 905 and the secondary load 912 may draw power from the battery 901, irrespective of the position of the switch 903. Ideally, these loads are small enough that they will not significantly affect the life of the battery, even if the loads are drawn below the threshold temperature for efficient operation of the battery 901.

Another problem that may occur with high-temperature batteries, lithium thionyl chloride batteries in particular, is called "passivation." Essentially, when the battery is passive for a period of time, the chemicals in the battery develop a resistance to electrical current. Passivation resistance is caused by a film of lithium chloride that forms on the surface of the battery anode (negative terminal) and creates an internal high resistance layer between the electrodes.

After a load is placed on a cell, the high resistance of the passivation layer causes the battery's voltage to dip. The discharge reaction slowly removes the passivation layer, thereby lowering the internal resistance of the battery. This, in turn, will cause the battery's voltage to rise to the normal operating value.

In some cases, a control electronics (e.g., control electronics 905 in FIG. 9) will provide a small load that will prevent the development of the film that causes passivation resistance. In addition, an additional load, such as memory 912 in FIG. 9, may draw a load sufficient to prevent passivation. A load that draws as little as 10 μA may be enough to prevent battery passivation.

In other cases, the control electronics and the additional load, if included, may not draw enough power to prevent passivation. In those cases, and in cases where such loads are not included, it may be advantageous to include a mechanism to speed the depassivation of the battery, once a temperature dependent switch is closed (e.g., switch 903 in FIG. 9).

Figure 10:
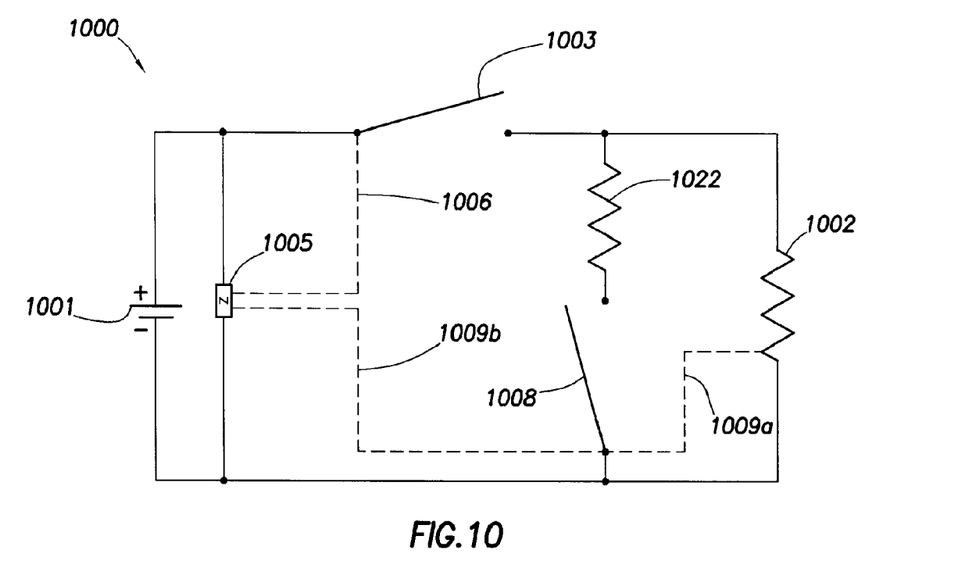
FIG. 10 shows a schematic of another electrical circuit for a downhole tool battery provided with a depassivator switch and a limiting resistor.

FIG. 10 shows a circuit 1000 that is similar to the circuit 400 in FIG. 4, except that the circuit 1000 in FIG. 10 includes a depassivator switch 1008 and a limiting resistor 1022. FIG. 10 shows a battery 1001 that is connected to a load 1002 via a switch 1003. The switch 1003 is controlled by a control electronics 1005 that is operatively coupled (shown at 1006) to the switch 1003.

The depassivator switch 1008 is connected to the battery 1001 in series with the switch 1003 and in parallel with the load 1002. In such a configuration, the depassivator switch 1008 will not be effective when the switch 1003 is open. When the switch 1003 is closed, however, the depassivator switch 1008 may also be closed to draw additional current from the battery 1001. The depassivator switch 1008 may be closed until the battery 1001 is sufficiently depassivated.

In some cases, the depassivator switch 1008 may be connected in series with a depassivating resistor 1022. The depassivating resistor 1022 limits the current that is drawn by the depassivator switch 1008. In addition, a constant current source may be substituted for the depassivating resistor 1022. A constant current source would provide a small electrical current that would depassivate the battery 1001.

The depassivator switch 1008 may be controlled by several different methods. For example, the depassivator switch 1008 may be operatively coupled (shown at dashed line 1009*a*) to the load 1002. The particular tool component that makes up the load may include the necessary equipment to monitor the voltage of the battery 1001 and control the depassivator switch 1008. When battery voltage is low, indicating passivation, the depassivator switch 1008 may be closed to aid in depassivating the battery 1001. Once the battery voltage returns to a normal value, the depassivator switch 1008 may be opened to prevent unnecessary drain on the battery 1001.

In another example, the depassivator switch 1008 may be operatively coupled (shown at dashed line 1009*b*) to the control electronics 1005, which may control the depassivator switch 1008 in a similar manner. In practice, a depassivator switch would generally be controlled by only one mechanism. Two dashed lines (1009*a*, 1009*b*) are shown in FIG. 10 for illustrative purposes, although such configurations do not depart from the scope of the invention.

Figure 11:
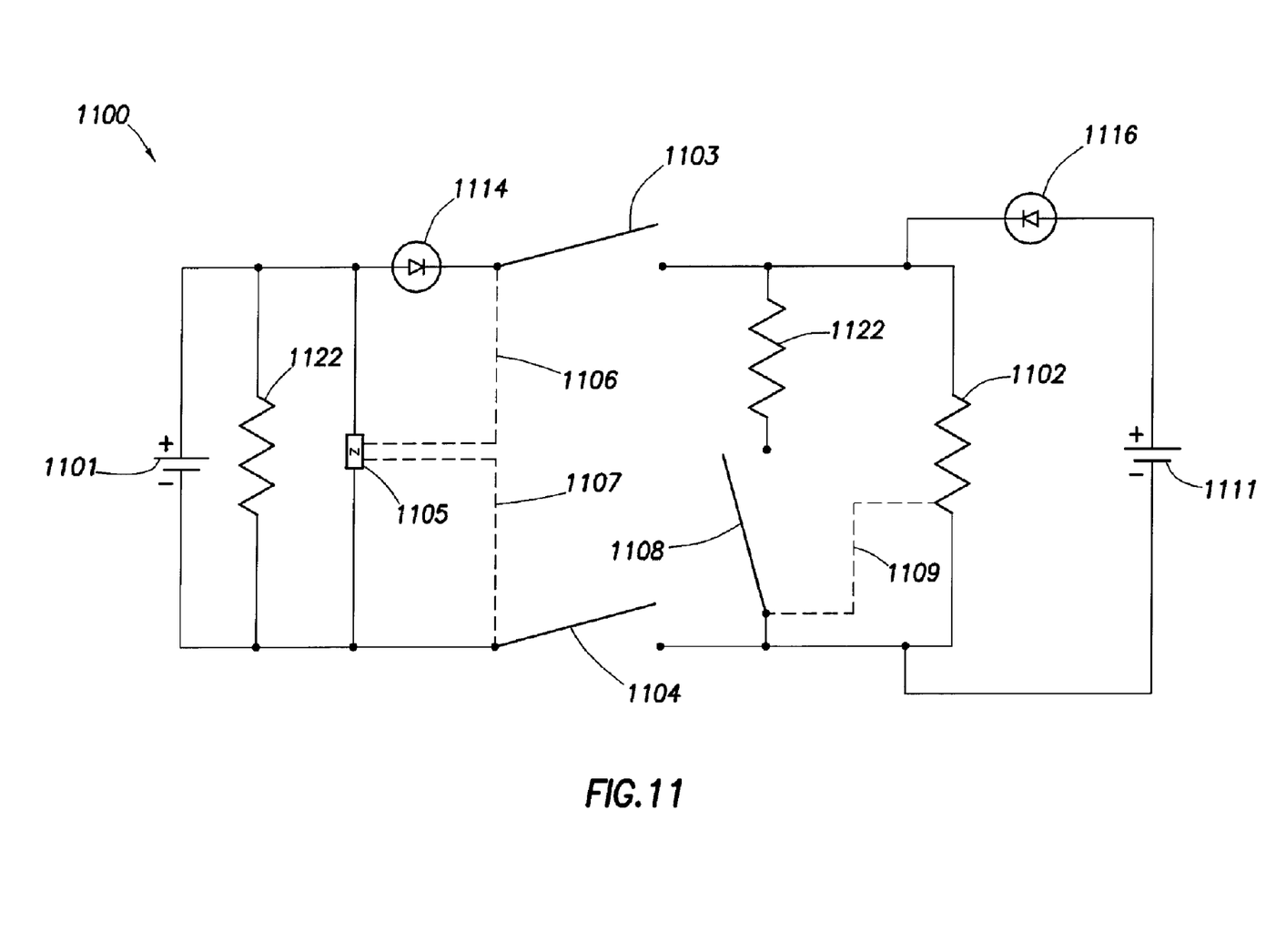
FIG. 11 shows a schematic of another electrical circuit for a downhole tool battery provided with two switches, control electronics, a secondary load and a depassivator switch.

FIG. 11 is a schematic of a circuit 1100 that includes multiple features that have been previously described. The circuit 1100 includes a battery 1101 that is electrically connected to a load 1102. A first switch 1103 is electrically connected between the load 1102 that the positive terminal of the battery 1101, and a second switch 1104 is electrically connected between the load 1102 and the negative terminal of the battery 1101.

A control electronics 1105 is electrically connected to the battery 1101, in parallel with the switches 1103, 1104 and the load 1102. The control electronics 1105 is operatively coupled to the first switch 1103 (shown at 1106) and to the second switch 1104 (shown at 1107). The control electronics 1105 controls the switches 1103, 1104 to close when the tool temperature exceeds a selected temperature. The control electronics may also be configured to open the switches 1103, 1104 when the tool temperature falls below the selected temperature.

The selected temperature may be selected to be a temperature that is above a threshold temperature, above which the battery 1101 is operated with an acceptable efficiency. In addition, the control electronics may use a hysteresis mechanism to control the switches 1103, 1104, so that the switched 1003, 1104 are not opened and closed multiple times when the tool temperature is near the selected temperature. For example, a delay may be used such that the switches 1103, 1104 are opened at a selected time after the tool temperature exceeds the selected temperature. In some cases, the selected temperature above which the switches 1103, 1104 are closed may be slightly higher than a second selected temperature below which the switches 1103, 1104 are opened.

The circuit 1100 in FIG. 11 includes a secondary load 1112 that is electrically connected to the battery 1101, in parallel with the switches 1103, 1104 and the load 1102. The secondary load 1112 is able to draw power from the battery 1101, irrespective of the position of the switches 1103, 1104. The secondary load 1112 may comprise, for example, a computer or electronic memory device. FIG. 11 shows the secondary load 1112 connected in parallel with the control electronics 1105, but, as will be recognized by those having ordinary skill in the art, it may be connected in series with the control electronics 1105, and both will still be able to draw power from the battery 1101, irrespective of the position of the switches 1103, 1104.

It is noted that a secondary load may be connected to the circuit in many configurations. For example, a secondary load may be electrically connected to be in series with one switch and in parallel with another. In such a configuration, the secondary load would receive power from the battery irrespective of the position of the switch with which it is in parallel. However, the other switch, with which the secondary load is connected in series, will affect the operation of the secondary load. In this manner, the operation of the secondary load may also be controlled by a switch.

The circuit 1100 includes a depassivator switch 1108 that is operatively coupled to the load 1102. The depassivator switch 1108 in FIG. 11 is shown in series with the switches 1103, 1104 so that the depassivator switch 1108 may not draw power from the battery 1101 when either one or both switches are open. The load 1102 may control the depassivator switch 1108 to close when the battery voltage drops due to passivation and to open when the battery 1101 has been adequately depassivated. In addition, the circuit 1100 may include a depassivating resistor 1122 to limit the current drawn by the depassivator switch 1108.

The circuit 1100 shown in FIG. 11 also includes a connector (not specifically shown) that enables an external power source 1111 to be connected to the load 1102. The circuit 1100 includes a first diode 1114 that may form a diode-OR gate with a corresponding second diode 1116 connected to the external power source 1111. The diode-OR gate may enable the external power source 1111 to supersede the battery 1101, even when the switches 1103, 1104 are closed.

Figure 12:
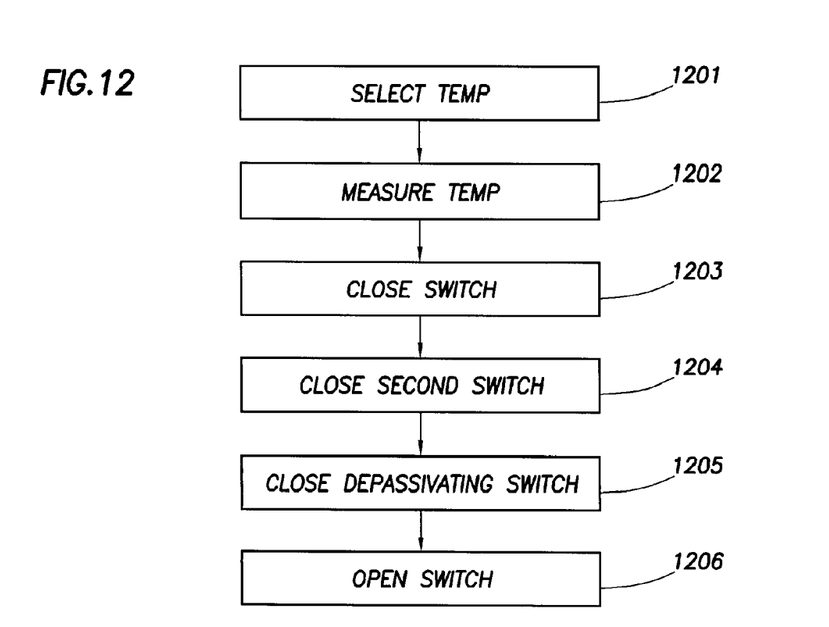
FIG. 12 shows a method for preventing power loss of a high temperature battery in a downhole tool.

FIG. 12 shows a method in accordance with the invention. The method may include selecting a selected temperature, at step 1201. This step may include selecting a temperature based on a known operating temperature range for the battery. In some cases, the selected temperature may be selected to be above the lowest point in the operating range.

Next, the method may include measuring the tool temperature, at step 1202. This is shown as one step, but in practice, measuring the tool temperature may be performed continuously or at selected intervals during the operation of the downhole tool. Next, the method may include closing a switch to enable the battery to supply power to a load, at step 1203. The switch may be closed when the tool temperature exceeds the selected temperature. This will ensure that the battery is operated only in the desired operating range, where the battery operates most efficiently.

Next, the method may optionally include closing a second switch, if such a switch is included in the circuit, at step 1204. The second switch may be a backup to the first switch, and the switches may be in a "fail closed" configuration. In the event that both switches fail closed, the tool will continue to have power until the battery power is exhausted. While not generally desirable, this situation may be preferred to eliminating battery power and not being able to operate the tool at all.

Next, the method may optionally include closing a depassivating switch, if such a switch is provided, at step 1205. Sensors within the tool may measure the battery supply to determine if the battery has been passivated. If so, closing the depassivating switch may draw more power from the battery so that it will become depassivated more quickly.

Finally, the method may include opening any switches that are closed, at step 1206. This may occur when the tool temperature falls below the selected temperature. This will prevent the battery from providing power when it would do so very inefficiently. This will conserve battery power.

Variations to the apparatuses and methods described herein may be envisioned. For example, such a system may be used in a variety of downhole tools, such as the drilling and wireline tools depicted, or other tools such as permanent monitoring, coiled tubing, completions and others.

Advantageously, a downhole tool circuit in accordance with certain embodiments of the invention may provide one or more of the following advantages. A high-temperature battery may be used in connection with a downhole tool without significant power being drawn from the battery when the tool temperature is below a threshold temperature for efficient operation of the battery. Once the tool temperature exceeds a selected temperature, ideally above the threshold temperature, the battery may operate more efficiently and a switch or switches may close to enable power to be drawn from the battery.

Advantageously, embodiments of the invention may enable control of the switches by a control electronics that draws a small amount of power from the battery, irrespective of the position of the switch. Such a load may, in some cases, be sufficient to prevent passivation of the battery. In addition, a small amount of battery power may be provided to a small load, for example a computer or electronic memory, irrespective of the position of the switch row switches.

Advantageously, embodiments of the invention may enable depassivation of the battery. In some embodiments, this is an active depassivation of the battery that occurs when the battery voltage indicates that the battery has become passivated. Advantageously, active depassivation may be stopped when the battery voltage indicates that the battery has been sufficiently depassivated.

Advantageously, embodiments of the invention may enable the connection of an external power source so that the tool may be powered at the surface, when the tool temperature is below the selected temperature. Advantageously, the battery power may be superseded by an external power source, even when the battery is active.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electrical circuit for a downhole tool, comprising:
   a battery;
   a load electrically connected to the battery, wherein the load comprises a component of the downhole tool; and
   at least one switch electrically connected to the battery and the load,
   wherein the at least one switch is configured to close the electrical circuit to the load when a temperature indicative of a battery temperature exceeds a selected temperature.

2. The electrical circuit of claim 1, wherein the at least one switch is further configured to open the electrical circuit when the temperature indicative of the battery temperature is below the selected temperature.

3. The electrical circuit of claim 1, wherein the selected temperature is selected to be higher than a lowest point in a preferred operating range for the battery.

4. The electrical circuit of claim 1, wherein the selected temperature is about seventy degrees Celsius.

5. The electrical circuit of claim 1, wherein the selected temperature is about one hundred degrees Celsius.

6. The electrical circuit of claim 1, wherein the at least one switch comprises an integrated circuit temperature sensor.

7. The electrical circuit of claim 1, wherein the at least one switch comprises a thermistor.

8. The electrical circuit of claim 1, wherein the at least one switch comprises a resistive temperature detector.

9. The electrical circuit of claim 1, wherein the at least one switch comprises a thermostat.

10. The electrical circuit of claim 9, wherein the thermostat is a bimetallic thermostat.

11. The electrical circuit of claim 1, wherein the at least one switch comprises a relay.

12. The electrical circuit of claim 1, wherein the at least one switch comprises a transistor.

13. The electrical circuit of claim 1, further comprising a control electronics operatively connected to the at least one switch, wherein the control electronics is configured to control the at least one switch to close the electrical circuit when the temperature indicative of the battery temperature exceeds the selected temperature.

14. The electrical circuit of claim 13, wherein the control electronics is electrically connected to the battery in parallel with at least one switch and the load.

15. The electrical circuit of claim 1, wherein at least one switch is electrically connected between a positive terminal of the battery and the load.

16. The electrical circuit of claim 1, wherein at least one switch is electrically connected between the load and a negative terminal of the battery.

17. The electrical circuit of claim 1, wherein the at least one switch comprises a first switch and a second switch, wherein the first switch is electrically connected between a positive terminal of the battery and the load, the second switch is electrically connected between the load and a negative terminal of the battery.

18. The electrical circuit of claim 17, further comprising a control electronics operatively connected to the first switch and the second switch, wherein the control electronics is configured to control the first and second switches to close the electrical circuit when the temperature indicative of the battery temperature exceeds the selected temperature.

19. The electrical circuit of claim 18, wherein the control electronics is electrically connected to the battery in parallel with the first switch, the second switch, and the load.

20. The electrical circuit of claim 19, further comprising a secondary load electrically connected to the battery in parallel with the first switch and the load, wherein the secondary load is operatively coupled to the control electronics.

21. The electrical circuit of claim 20, wherein the secondary load comprises a memory.

22. The electrical circuit of claim 1, further comprising a connector electrically connected to the load to bypass the at least one switch, wherein the connector is adapted to connect with an external power source.

23. The electrical circuit of claim 22, further comprising a first diode electrically connected to the battery and in series with the at least one switch and adapted to operate cooperatively with a second diode connected in series with in the external power source to prevent the battery from supplying power to the load when the external power source is connected.

24. The electrical circuit of claim 1, further comprising a depassivation switch electrically connected to the battery in series with the at least one switch and parallel to the load.

25. The electrical circuit of claim 24, further comprising a current limiting resistance electrically connected to the battery and in series with the depassivation switch and parallel to the load.

26. The electrical circuit of claim 1, wherein the battery comprises a lithium thionyl chloride battery.

27. The electrical circuit of claim 1, wherein the at least one switch comprises a first switch and a second switch, wherein the first switch is electrically connected between a positive terminal of the battery and the load, the second switch is electrically connected between a negative terminal of the battery and the load, and further comprising:

a control electronics electrically connected to the battery in parallel with the first switch, the second switch, and the load, wherein the control electronics is operatively connected to the first switch and the second switch and configured to control the first and second switches to close the electrical circuit when the temperature indicative of the battery temperature exceeds the selected temperature;

a depassivation switch electrically connected to the battery in series with the first and second switches and parallel to the load;

a current limiting resistance electrically connected to the battery and in series with the depassivation switch and parallel to the load;

a connector electrically connected to the load to bypass the first and second switches, wherein the connector is adapted to connect with an external power source;

a first diode electrically connected to the battery and in series with one of the first and second switches, the first diode adapted to operate cooperatively with a second diode connected in series with the external power source to prevent the battery from supplying power when the external power source is connected; and a memory electrically connected to the battery in parallel with the first switch and the load, wherein the second load draws a substantially small current from the battery.

28. A method for preventing power loss in a high-temperature battery in a downhole tool positioned in a wellbore penetrating a subsurface formation, comprising:

measuring a temperature indicative of the battery temperature; and closing at least one switch in a high-temperature battery circuit thereby coupling the battery to a load when the temperature indicative of the battery temperature exceeds a selected temperature, wherein the load comprises a component of the downhole tool.

29. The method of claim 28, further comprising selecting the selected temperature to be above a lowest point in a preferred operating range for the battery.

30. The method of claim 28, further comprising opening the at least one switch when the temperature indicative of the battery temperature falls below the selected temperature.

31. The method of claim 30, wherein the closing the at least one switch comprises using a hysteresis routine to prevent repeated opening and closing of the at least one switch when the temperature indicative of the battery temperature is near the selected temperature.

32. The method of claim 28, further comprising closing a depassivation switch.

33. A downhole tool, comprising:
a high-temperature battery;
a tool component electrically connected to the battery; and
at least one switch electrically connected between the battery and the tool component,
wherein the at least one switch is configured to close a circuit to the tool component when a temperature indicative of a battery temperature exceeds a selected temperature.

34. The downhole tool of claim 33, wherein the at least one switch comprises a first switch and a second switch, wherein the first switch is electrically connected between a positive terminal of the battery and the tool component and the second switch is electrically connected between the tool component and a negative terminal of the battery.

35. The downhole tool of claim 33, further comprising a control electronics operatively connected to the at least one switch and configured to control the at least one switch to close when the temperature indicative of the battery temperature exceeds a selected temperature.

36. The downhole tool of claim 35, wherein the control electronics is electrically connected to the battery in parallel with the at least one switch and the tool component.

37. The downhole tool of claim 33, further comprising a depassivating switch electrically connected to the battery in series with the at least one switch and in parallel with the tool component.

38. The downhole tool of claim 33, further comprising an external connector electrically connected to the tool component and adapted to connect with an external power source.

39. The downhole tool of claim 38, further comprising a first diode electrically connected to the battery in series with the at least one switch and adapted to operate cooperatively with a second diode connected in series with the external power source to prevent the battery from supplying power when the external power source is connected.

40. The downhole tool of claim 33, wherein the high-temperature battery comprise a lithium thionyl chloride battery.

41. The downhole tool of claim 33, wherein the downhole tool comprises a drilling tool.

42. The downhole tool of claim 33, wherein the downhole tool comprises a wireline tool.

* * * * *